July 17, 1923.
A. C. WOOD
CONDUCTOR SUPPORT
Filed Dec. 30, 1922
1,461,812
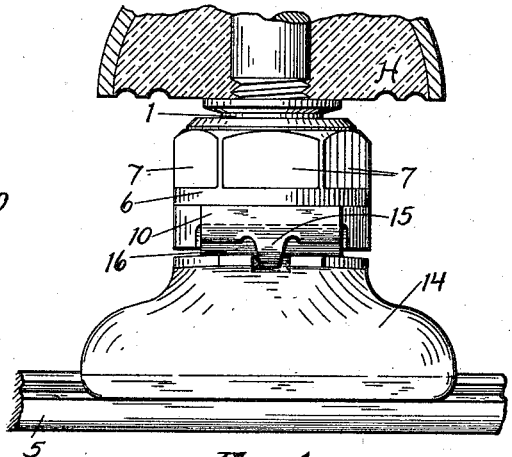
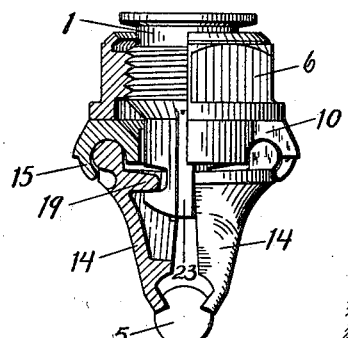
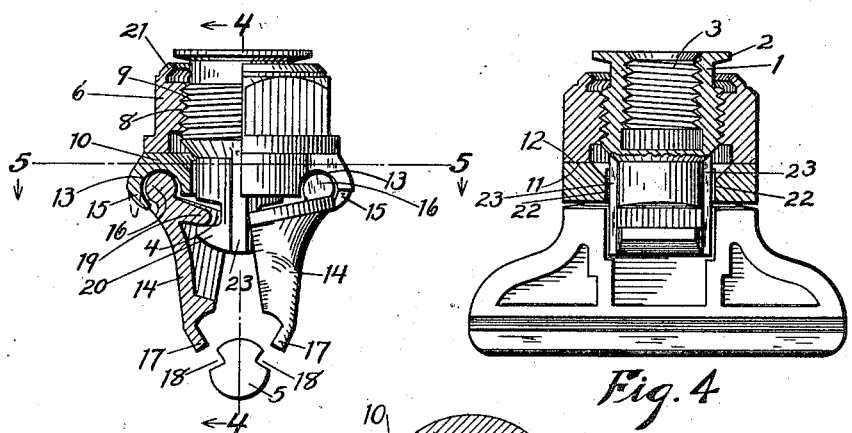
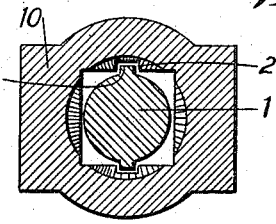
Inventor
ARTHUR C. WOOD
By
Attorney Patented July 17, 1923.

1,461,812

UNITED STATES PATENT OFFICE.

ARTHUR C. WOOD, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed December 30, 1922. Serial No. 609,967.

*To all whom it may concern:*

Be it known that I, ARTHUR C. WOOD, a citizen of the United States of America, residing at Mansfield, in the county of Richland and State of Ohio, have invented certain new and useful Improvements in Conductor Supports, of which the following is a specification.

My invention relates to supports for conductors and particularly to that class of support known as conductor clamp by means of which a trolley wire or other conductor may be gripped and supported from a support.

The object of my invention is to produce a simple, cheap and efficient device and my invention resides in the new and novel construction, combination and relation of the various parts hereinafter more fully described and shown in the accompanying drawings.

In the drawings:—

Fig. 1 is a side view in elevation of a support embodying my invention and shown as gripping a trolley wire, and also shown as secured to a hanger H.

Fig. 2 is an end view in partial section of the device shown in Fig. 1.

Fig. 3 is an end view in partial section of my device shown with the jaws open in position ready to receive the conductor.

Fig. 4 is a longitudinal view on the line 4—4 of Fig. 3.

Fig. 5 is a sectional view on the line 5—5 of Fig. 3.

In the preferred form of device embodying my invention I employ a supporting member 1 provided at the upper end with a flange 2 and with a threaded recess 3 to receive the threaded stud of the hanger H. The lower end of the member 1 is provided with oppositely and symmetrically disposed grooves 4 extending in a longitudinal direction with respect to the clamp or conductor 5.

Rotatably mounted upon the support 1 is an operating member 6 provided with polygonal faces 7 to receive a wrench. The member 6 is provided with an internally threaded recess 8 engaging with the thread 9 on the member 1. By rotating the member 6 it will move toward or away from the flange 2 due to its threaded engagement with the member 1.

Slidably, but non-rotatably, mounted upon the member 1 is an intermediate member 10 having a face 11 to engage with the face 12 of the operating member 6. The member 10 is provided with two longitudinally disposed semi-circular channels 13 positioned on opposite sides of the center line to receive in pivotal engagement therewith the clamping members 14. The channels 13 may be of other shapes than shown without effecting the operation of the device. Projecting downwardly and adjacent the channels are lugs 15 which are originally formed straight as shown by the dotted line, and after the jaws 14 are positioned in place are bent over thereby locking the jaws in position, but in pivotal relation with the intermediate member 10.

The jaws 14 are each provided with a longitudinally disposed member 16 shaped to conform to the curvature of the channel 13. The lower edge of each jaw is provided with lip 17 to engage the groove 18 of the conductor 5. The jaws are each provided with a flange 19 which is positioned in the groove 4. The member 20 forming the lower face of the groove 4 acts as a support for the flanges 19 which slide and pivot upon the member 20 as the jaws 14 are moved into or out of engagement with the conductor 5. It will be plainly seen that if the member 10, and of necessity the jaws, are moved relative to the supporting member 1 that the jaws will be moved into or out of engagement with the conductor 5. Secured to the upper edge of the member 6 is a flange 21 which originally was formed straight, but which after assembly of the parts is turned inwardly by any well known means so that it will engage with the flange 2 thereby limiting the upward movement of the member 6 relative to the member 1 and preventing the dis-assembly of the parts.

The passage through the member 10 is provided with two oppositely disposed slots 22 and the member 1 is provided with oppositely disposed ribs 23 each engaging in one of the slots 22 to prevent relative rotation of the member 10 with respect to the member 1.

In the use of my device, the same is first installed upon the stud of the hanger H by means of the threaded recess 3. The jaws are then brought into alinement with the conductor 1 which is raised up into position between the lips 17 and the member 6 is then rotated in a direction which will move it downwardly relative to the member 1 and into engagement with the member 10 which in turn will move the jaws downwardly, but on account of their engagement with the member 1 due to the flange 19 interengaging with the slot 4, the lips 17 of the jaws will be moved inwardly simultaneous with the downward movement of the jaws until the lips engage the conductor 5. By applying a wrench to the polygonal faces 7 the jaws can be brought into firm and secure engagement with the conductor 5.

It will be observed that the jaws 14 are pivotally secured to the member 10 and when the device is operated to move the jaws into engagement with the conductor 5, that the jaws pivot in its channel 13 and the flanges 19 of the jaws have a sliding and pivotal relation relative to the member 20.

There are, of course, many modifications of my invention which may be made and will be apparent to those skilled in the art, but I do not wish to be limited other than by my claims.

I claim:

1. A conductor support comprising in combination a support member, an element slidably and non-rotatably mounted on the support member, a pair of coacting jaws pivotally secured to the said element and having engagement with the support member and operating means mounted on the support member in rotatable and longitudinally movable relation thereto and engaging the element when rotated in one direction to move the element and in turn move the jaws into engagement with the conductor.

2. A conductor support comprising in combination a support member, an element slidably mounted on the support member, a pair of coacting jaws pivotally secured to the said element and having engagement with the support member and operating means mounted on the support member in rotatable and longitudinally movable relation thereto and engaging the element when rotated in one direction to move the element and in turn move the jaws into engagement with the conductor.

3. A conductor support comprising in combination a support member, an element slidably and non-rotatably mounted on the support member, a pair of coacting jaws pivotally secured to the said element and having engagement with the support member and operating means mounted on the support member in movable relation thereto and engaging the element when moved in one direction to move the element and in turn move the jaws into engagement with the conductor.

4. A conductor support comprising in combination a support member, an element slidably mounted on the support member, a pair of coacting jaws pivotally secured to the said element, and having engagement with the support member and operating means mounted on the support member in movable relation thereto and engaging the element when moved in one direction to move the element and in turn move the jaws into engagement with the conductor.

5. A conductor support comprising in combination a support member, a pair of jaws engaging the support member and coacting to grip a conductor, an operating means movably mounted on the support member, and means interposed between the operating means and the jaws to support the jaws and move the jaws into engagement with the conductor when the operating means is moved into engagement with the interposed means.

6. A conductor support comprising in combination a support member, a pair of jaws engaging the support member and coacting to grip a conductor, an operating means threadably mounted on the support member, and means interposed between the operating means and the jaws to support the jaws and move the jaws into engagement with the conductor when the operating means is rotated into engagement with the interposed means.

7. A conductor support comprising in combination a support member, a pair of jaws engaging the support member and coacting to grip a conductor, an operating means movably mounted on the support member, means interposed between the operating means and the jaws to support the jaws and move the jaws into engagement with the conductor when the operating means is moved into engagement with the interposed means and means on the support member engaging means on the interposed means to prevent relative rotation of said parts.

8. A conductor support comprising in combination a support member, a pair of jaws engaging the support member and coacting to grip a conductor, an operating means movably mounted on the support member, means interposed between the operating means and the jaws to move the jaws into engagement with the conductor when the operating means is moved into engagement with the interposed means and means on the interposed means to engage the jaws and support them in pivotal relation thereto.

9. A conductor support comprising in combination a support member, an operating means mounted on the support member, an intermediate member supporting a pair of jaws in pivotal relation thereto and means on the jaws engaging the support member to move the jaws into engagement with a conductor when the operating member moves the intermediate member in longitudinal relation to the support member.

In testimony whereof I affix my signature.

ARTHUR C. WOOD.